United States Patent Office 3,360,822
Patented Jan. 2, 1968

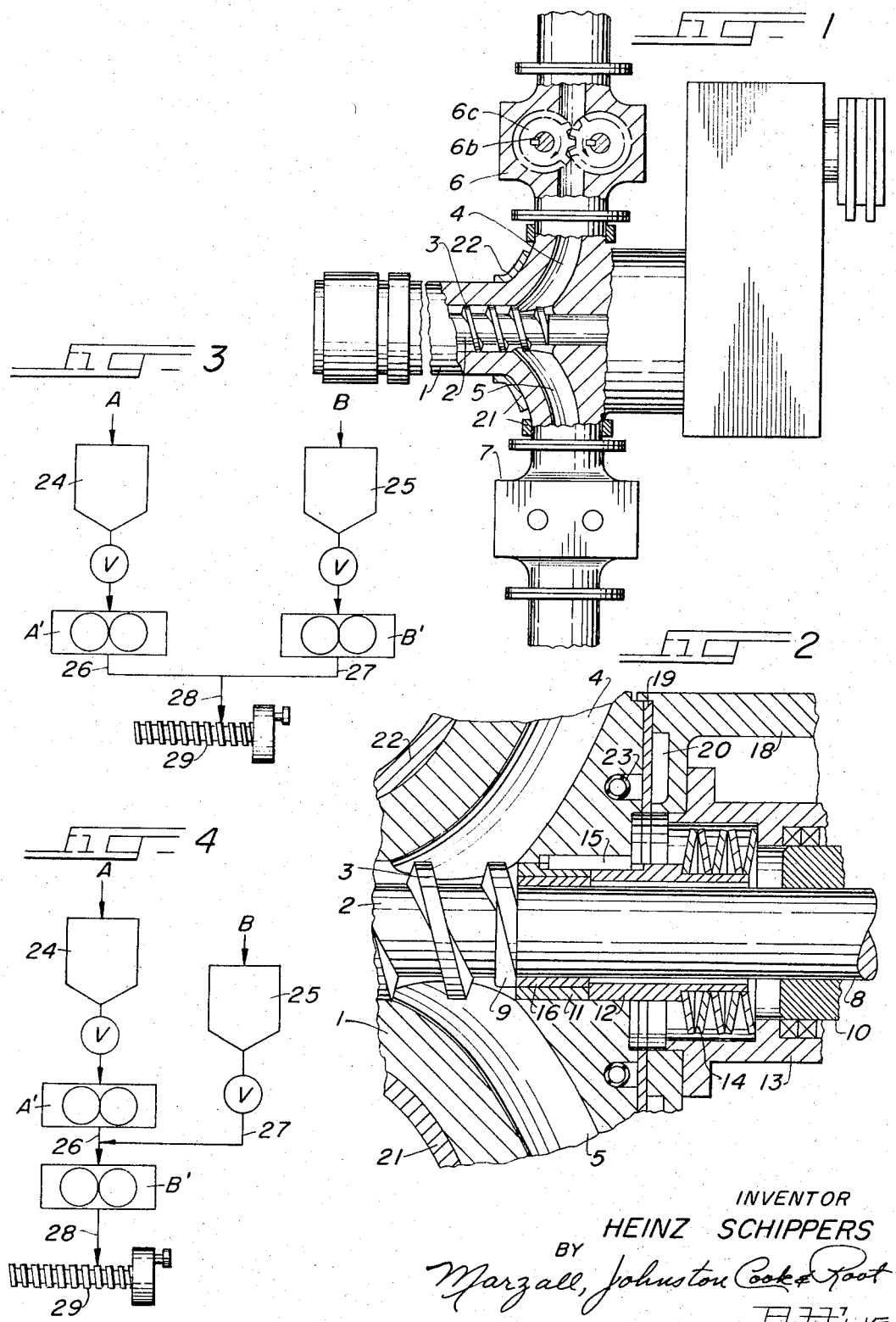

3,360,822
HOT MELT EXTRUDER
Heinz Schippers, Remscheid-Lennep, Germany, assignor to Barmer Maschinenfabrik Aktiengesellschaft Wuppertal-Oberbarmen, Germany
Filed Nov. 2, 1965, Ser. No. 506,042
Claims priority, application Germany, Nov. 9, 1964, B 79,254
7 Claims. (Cl. 18—12)

ABSTRACT OF THE DISCLOSURE

A screw extruder for processing a mixture of two or more thermoplastic polymers and/or other initial materials in which the feed means for different molten initial constitute separate feed channels interconnected through a common collecting channel to the entry zone of the extruder with gear wheel pumps to control the influx amount of initial material through each of the feed channels, at least one of these pumps being located in the common collecting channel.

---

This invention relates to a screw extruder for the processing of thermoplastic synthetic polymers in the molten state, and more particularly, the invention is directed to a combination of apparatus in which different initial thermoplastic materials are supplied in a molten or plastic state for processing in the hot melt extruder.

Where it is desirable to thoroughly mix or homogenize thermoplastic polymers or similar materials composed of two or more initial components, it is known that special mixing or kneading heads can be arranged at the outlet end of the screw and/or the screw itself can be constructed over its entire conveying length or sections thereof in such a manner that a very intense mixing action can be achieved. However, this mixing of the different components in a screw extruder does not yield a consistently uniform extrusion product unless the material to be extruded is uniformly supplied to the screw or worm in the prescribed ratio of its individual components.

It has been a common practice to thoroughly premix the initial components in the form of a powder or granules and then feed this mixture with its specific ratio of components into the extruder by means of the usual funnel-shaped hopper or similar feed device. Although the correct ratio is obtained by premixing the powdery or granulated raw materials, it is impossible to avoid vibrations which are transmitted from the driven screw to the whole apparatus and which tend to cause a partial unmixing or reclassification of the initial components due to the different size or specific weight of the particles or granules. The ratio of the components in the mixture then varies from section to section in the screw extruder, and the extruded product is correspondingly non-uniform.

In order to avoid such problems of working with a powder or similar solid granulated material, the mixing of the thermoplastic material is frequently carried out as a batch process in an autoclave wherein a thermoplastic polymer can be maintained in the hot molten state and mixed, for example, with color pigments. The various components must be thoroughly mixed in the correct proportions in the autoclave, and the resulting mixture in the form of a paste or fluid, e.g. with a honey-like consistency, can then be further processed into finished articles which again may require the use of a screw extruder. When working in this manner, the premixing of the components in the autoclave must be quite thorough before it is further processed into a finished product, even though a screw extruder is employed for this purpose. In other words, any mixing function of the screw extruder is essentially lost when premixing is carried out in an autoclave. Furthermore, when producing large quantities of a single uniform product on a commercial scale, a single batch from one autoclave is not sufficient and several batches must be mixed successively to provide separate charges supplied to the extruder. In addition to the higher costs involved when using such separate batches or charges, there is still a danger that the composition of the end product will vary from batch to batch resulting in differences in quality or color.

One object of the invention is to provide means in combination with a screw extruder which will permit a rapid and continuous processing of a molten thermoplastic material, especially synthetic polymers, as obtained from two or more different initial components.

Another object of the invention is to provide a simultaneous feed of the initial components of a thermoplastic mixture to the extruder under precisely controlled conditions whereby the ratio of the components in the total feed is constantly maintained, and these components can then be processed by intensive mixing in the extruder to yield a highly uniform product of any quantity.

These and other objects and advantages of the invention will become apparent from the following detailed description taken in conjunction with the accompanying drawing.

It has now been found, in accordance with the invention, that it is possible to achieve a considerable improvement in the hot melt processing of two or more different components of a thermoplastic mixture in a screw extruder of the conventional type comprising a mixing screw mounted for rotation in an elongated hollow barrel so as to receive the material to be extruded in an entry zone at one end of the screw, if one combines with this screw extruder: feed means for simultaneously supplying different initial materials in the molten state into the entry zone of the screw extruder, these feed means including at least two separate feed channels interconnected with the entry zone; and dosage pump means to positively control the influx amount of initial molten material through each of the feed channels. The dosage pump means are preferably gear wheel pumps which, in certain embodiments of the invention, are advantageously designed to perform a mixing as well as a pumping function.

Specific embodiments of the invention are shown in the drawing wherein:

FIG. 1 is a partly schematic plan view of a screw extruder with the entry zone of the screw and one feed pump shown in cross-section;

FIG. 2 is an enlarged cross-sectional view of the entry zone as shown in FIG. 1, an additional cross-sectional view being provided to show in greater detail the right-hand portion of the screw and its drive shaft and the manner in which these elements are assembled in the hot melt extruder;

FIG. 3 is a schematic illustration in the form of a flow-sheet of a means for feeding two components of a thermoplastic mixture through gear wheel pumps arranged in parallel such that the two components are combined in a single conduit or channel and then introduced into the entry zone of the screw; and FIG. 4 is a schematic flowsheet illustrating another means of feeding two components of a thermoplastic mixture through gear wheel pumps arranged in series such that the two components are again combined in a single conduit and then introduced into the entry zone of the screw.

Referring to FIGS. 1 and 2, the extruder cylinder or barrel 1 is longitudinally bored to receive a conventional mixing screw 2 having a spiral thread 3, the screw rotating in the barrel so as to mix and convey a thermoplastic material through the extruder. The barrel 1 also contains two feed conduits or channels 4 and 5 which serve to introduce the initial molten components directly into the entry zone of the screw, these two feed channels being completely separate from each other except as they are interconnected through the entry zone. In order to supply the different initial components of the thermoplastic material to be processed under a predetermined pressure and in a prescribed amount, the gear wheel pumps 6 and 7 are connected by means of flanges into each of the feed channels 4 and 5. Each gear wheel pump is independently controlled and driven, for example through drive shaft 6b keyed to one of the gear wheels 6c. By changing or adjusting the rotational speed of the gear wheels in each of the pumps independently of each other, the amount of the initial component being conveyed in each of the feed channels 4 and 5 can also be varied independently of one another and the mixing ratio of the two components corresponding to the desired final product can be precisely maintained.

The feed channels 4 and 5 as shown in FIGS. 1 and 2 are slanted inwardly toward the screw in such a manner that their center lines intersect that of the screw at an acute angle. However, these feed channels can also be arranged such that their center lines meet or cross the center line of the screw radially at an angle of 90°, or the center lines of the feed channels can also cross the center line of the worm at an angle such that the feed melt enters the cylindrical entry zone of the screw approximately tangentially. In other words, the molten feed preferably enters the cylindrical space of the screw entry zone so that its direction of flow is at least partly in the same direction of flow of the thermoplastic material along the mixing screw. Depending upon the number of different initial components required for the thermoplastic mixture, the screw extruder can be equipped with more than two feed channels and pumps.

In order to achieve good quality control of the final product, it is very desirable to employ various heating and cooling elements in the screw extruder and its associated feed channels or conduits according to the invention. For example, the barrel or cylinder of the screw can be heated or cooled by conventional means in order to maintain the desired temperature relationships in various zones of the screw. Also, the feed channels are preferably heated to maintain each molten feed at a predetermined temperature as it is conveyed into the entry zone of the screw. On the other hand, it is desirable to cool and/or insulate the drive shaft of the screw and other portions of the extruder located behind the screw. The heating and cooling means as well as other preferred elements in the construction of the screw extruder are shown in much greater detail in FIG. 2 except as otherwise indicated.

As shown in FIG. 2, the threaded worm or screw 2 is connected to the main drive shaft 8 by an offset ring or collar 9, and the main drive shaft 8 is shown in a position where it is not further slidable to the right axially toward the secondary drive shaft 10 which is connected to the extruder gear. The packing bushing 11 and the pressure sleeve or ring 12 are pressed axially to the left against the screw shaft collar 9 by means of the compressed spring pack 14 supported on the stationary portion of the housing 13. The register or key spring 15 prevents the packing bushing 11 and the pressure sleeve 12 from turning together with the screw shaft 8 with reference to the cylinder 1. The inner surface of the packing bushing 11 is lined with a ring-shaped layer 16 of any suitable wear-resistant material. Likewise, the annular end face of the shaft collar 9 and the circumference of the drive shaft 8 are preferably protected with a similar wear-resistant material. In this manner, the mixing screw is firmly seated for rotation in the barrel or cylinder of the extruder, and there is sufficient pressure against the collar 9 to prevent the flow of thermoplastic material back over the drive shaft 8.

In order to prevent the conduction of heat from the barrel of the extruder or from those highly heated metal parts surrounding the screw shaft to the adjacent housing or gear casing 18, an annular cooling channel 20 can be provided in the casing 18 and closed off by means of a heat insulating gasket 19.

The feed channels 4 and 5 as well as the entry zone of the extruder and that portion of the barrel 1 surrounding the drive shaft 8 behind the entry zone can be maintained at a specified temperature by using heated bands 21 and 22. A tubular heating member 23 is most conveniently used behind the entry zone in order to supply heat independently of the rest of the heating means for the cylinder or barrel. By way of comparison, these particular zones in conventional screw extruders are generally unheated or actually cooled in many instances. Of course, any suitable heating device can be employed around the feed channels and the entry zone of the screw in order to prevent any heat loss of the melt entering the screw. Furthermore, it is also desirable to heat the pumps 6 and 7 and their respective feed lines in order to accurately maintain the temperature of the molten feed and avoid any undesirable loss of heat from the melt. The feed channels and the cylinder of the screw can also be surrounded with or wrapped in insulating material, but in view of the fact that thermoplastic polymers often require relatively high temperatures, auxiliary heating by means of electrically heated bands or heat exchange fluids is particularly desirable in order to maintain the initial molten components and the thermoplastic mixture at a specific temperature.

Instead of introducing each component of the thermoplastic mixture separately into the entry zone of the screw, two or more feed channels can be interconnected or joined to a common collecting channel which then carries the components, preferably in a premixed form, directly into the entry zone of the screw. These means for feeding combined components into the screw extruder are illustrated, by way of example, in FIGS. 3 and 4 wherein corresponding elements are designated by the same reference numerals or letters, it being understood that similar arrangements of the feed channels, pumps and collecting channel can be provided for three or even more different initial components.

As shown in FIG. 3, two different initial components A and B are first brought into a fluid form in their respective melting chambers 24 and 25 and then conducted through the separate feed channels 26 and 27 by means of the gear wheel pumps A' and B' inserted in each feed channel to the common collecting channel 28. By independent regulation of each of the feed pumps A' and B', the correct ratio of the individual components in relatively unmixed form is conducted by the common channel 28 into the entry zone of the screw extruder 29. All of the feed channels 26, 27 and 28 and the two pumps are preferably heated so as to maintain substantially constant temperatures of the molten materials, e.g. by means of electrically heated bands wrapped around the fluid conduits.

It is also especially advantageous to arrange the feed lines as shown in FIG. 4 wherein the gear wheel dosage pump B' of one component B is shifted into the common collecting channel 28 where it serves not only to measure the correct amount of B to be combined with A but also to premix these components before they are introduced into the entry zone of the screw 29. Where the feed A is actually a combination of components obtained from separate feed current paths combined in channel 26, such components are also favorably intermixed by the pump B'.

This principle of premixing the initial components by displacement or rearrangement of the dosage pump of a feed channel into the common collecting channel can be applied any number of times for each successive introduction of a new component. Thus, instead of arranging pumps in parallel as shown in FIG. 3, a number of pumps are placed successively in series according to FIG. 4 such that the dosage pump of each added feed channel is shifted into the common discharge or collecting channel which interconnects all of the preceding feed channels. This arrangement in series has the important advantage that the individual components of the thermoplastic mixture in their precisely controlled proportions are relatively thoroughly premixed before entering the extruder and thereby improve the mixing and homogenizing effect of the screw extruder.

In order to correctly dose and convey each component through its respective feed channel, it is of course necessary to employ a pump in each channel which can be individually adjusted by means of its own drive mechanism, completely independent of the remaining pumps. Gear wheel pumps are especially useful for this purpose since they are well designed to handle molten thermoplastic materials and also to achieve the desired premixing. Each gear wheel pump has its own drive shaft which can be independently driven by any conventional motor or other driving mechanism.

By joining the collecting channel or the separate feed channels to the extruder such that their center lines intersect or cross the center line of the screw at an arcuate to right angle, an additional premixing is achieved as the molten components enter into the passages between the screw or worm and the inner walls of the surrounding cylinder. Where separate feed channels issue into the entry zone of the screw, it is desirable that they be joined at about the same point longitudinally of the screw and preferably at symmetrical points around the circumference of the screw.

The screw extruder itself is of conventional design and adapted to provide a kneading, mixing or homogenizing of the particular thermoplastic mixture being treated under elevated temperatures and pressures. The degree of mixing within the screw extruder depends on a number of factors such as the geometrical relationships between the screw and the cylinder, especially the screw length and its thread construction with reference to depth and angle of inclination. The viscosity of the melt will also affect the mixing within the screw. In general, the screw mixing and homogenizing is largely influenced and can be controlled by the pressure relations which results from the particular pressure at the discharge or extrusion end of the screw in relation to the total pressure of the dosage pumps. The greater this pressure differential or gradient from the discharge end of the screw toward the dosage pumps in the melt to be processed is, the better is the reflux pressure in the screw so as to achieve a strong superimposed reflux flow together with the conveyance of molten material in the direction of extrusion. A very homogeneous and substantially complete mixing can thereby be assured by controlling the temperature and pressure of the molten thermoplastic mixture. After extrusion, the mixture can be solidified and granulated or otherwise further processed by conventional means.

The improved device according to the invention is generally adaptable to the precise mixing of any number of different thermoplastic components, including all of the well known thermoplastic polymers such as polyesters, polyamides, polyolefins or the like. Where it is desirable to mix or even interact two different polymers in the screw extruder, they are readily introduced through the separate feed channels after first being melted from solid granules or pellets. The mixing and extruding apparatus of the invention is also very useful for the purpose of adding dyes, pigments, brighteners, matting or delustering agents, plasticizers, antioxidants, fillers or other agents to one or more synthetic thermoplastic polymers. In this case, a master batch of the pigmented or otherwise treated polymer can first be prepared with a very large excess of the added agent which itself is not a thermoplastic material. This master batch or standard mixture in premelted form can then be dosed in relatively small amounts to the untreated polymer and uniformly distributed or mixed therewith in order to achieve a very uniform product over a long period of continuous operation. These and other variations in using the apparatus of the invention will be readily understood by those skilled in this art.

The separate supply of distinct components of a thermoplastic mixture by means of independently adjustable dosage pumps according to this invention, whereby a precise mixing ratio can be achieved, is especially advantageous in achieving a continuous process and provides a significant advance over the otherwise essential batch process where individual mixtures must be prepared in autoclaves in necessarily limited amounts. The precise determination of the mixing ratio can be rapidly adjusted so as to provide a means of achieving high quality control with a minimum of waste product. The premixing characteristics of the invention tend to reduce the length of time of the treatment in the screw extruder, and the adjustable pressure feature provides great flexibility in adapting the hot melt extrusion to changing requirements in the final product. Operation and maintenance of the extruder and feed means are minimal in labor and expense. Above all, the device according to the invention permits the rapid and continuous mixing of thermoplastic components into a homogeneous thermoplastic polymer product of exceptionally uniform quality.

The invention is hereby claimed as follows:

1. In a screw extruder for processing thermoplastic synthetic polymers in the molten state wherein said extruder includes a mixing screw mounted for rotation in an elongated hollow barrel so as to receive the material to be extruded in an entry zone at one end of the screw, the combination of:

feed means for simultaneously supplying different initial materials in the molten state into the entry zone of said screw extruder, said feed means including at least two separate feed channels interconnected through a common collecting channel to said entry zone; and dosage pump means to positively control the influx amount of initial molten material through each of said feed channels, at least one dosage pump being located in said common collecting channel.

2. A screw extruder as claimed in claim 1 wherein said dosage pump means are gear wheel pumps.

3. A screw extruder as claimed in claim 2 wherein a plurality of said feed channels and an equal number of said pumps are arranged in series leading into the common collecting channel connected to said entry zone of said extruder and each successively added feed channel is provided with its own independently controlled pump located in the common discharge channel which interconnects all of the preceding feed channels.

4. A screw extruder as claimed in claim 1 wherein the centerline of said common collecting channel is arranged at an acute to right angle with the center line of the screw.

5. A screw extruder as claimed in claim 1 wherein two feed channels are interconnected through a common collecting channel to the entry zone of said extruder with one dosage pump located in one of the feed channels and a second independently controlled dosage pump located in the common collecting channel.

6. A screw extruder as claimed in claim 5 wherein the center line of said common collecting channel is arranged at an acute to right angle with the center line of the screw.

7. A screw extruder as claimed in claim 1 having means associated therewith to premelt each of the different initial thermoplastic materials and means to maintain said materials in the molten state during transfer through said feed channels into the entry zone of the extruder.

(References on following page)

References Cited

UNITED STATES PATENTS

| | | | |
|---|---|---|---|
| 2,082,720 | 1/1937 | Ruthishauser | 18—14 X |
| 2,295,942 | 9/1942 | Fields. | |
| 2,366,417 | 1/1945 | MacMillin. | |
| 2,479,261 | 8/1949 | Reetz | 18—13 X |
| 2,540,146 | 2/1951 | Stober. | |
| 2,858,594 | 11/1958 | Eirich et al. | 18—30 X |
| 2,957,203 | 10/1960 | Marshall. | |
| 3,008,193 | 11/1961 | Been | 18—30 X |
| 3,110,420 | 11/1963 | Brewer. | |
| 3,245,116 | 4/1963 | Hendry | 18—12 |

WILLIAM J. STEPHENSON, *Primary Examiner.*